US010253249B2

United States Patent
Jiang et al.

(10) Patent No.: US 10,253,249 B2
(45) Date of Patent: Apr. 9, 2019

(54) COMPOSITIONS AND METHODS FOR TREATING SUBTERRANEAN FORMATIONS

(71) Applicant: SCHLUMBERGER TECHNOLOGY CORPORATION, Sugar Land, TX (US)

(72) Inventors: Li Jiang, Katy, TX (US); Bruno Lecerf, Houston, TX (US); Connor Coley, Cincinnati, OH (US); Philip Sullivan, Bellaire, TX (US); Brent Busby, Katy, TX (US); Jeremy Bedard, Minneapolis, MN (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 276 days.

(21) Appl. No.: 14/449,961

(22) Filed: Aug. 1, 2014

(65) Prior Publication Data
US 2016/0032176 A1 Feb. 4, 2016

(51) Int. Cl.
*E21B 43/28* (2006.01)
*C09K 8/72* (2006.01)
*C09K 8/74* (2006.01)

(52) U.S. Cl.
CPC ............... *C09K 8/725* (2013.01); *C09K 8/74* (2013.01)

(58) Field of Classification Search
CPC .......... E21B 33/13; E21B 43/16; E21B 43/27; E21B 43/22; C09K 8/60; C09K 8/02; C09K 8/52
See application file for complete search history.

(56) References Cited

U.S. PATENT DOCUMENTS 3,441,085 A * 4/1969 Gidley ..................... C09K 8/72
166/307
4,249,609 A * 2/1981 Haafkens ................. C09K 8/62
166/307

(Continued)

OTHER PUBLICATIONS

Brooks et al. ("The solubility in water of the barium, calcium and magnesium salts of sulfamic acid" Thesis of John F. Hooper, Department of Chemistry, State College of Washington, Pullman Washington 1941.*

(Continued)

*Primary Examiner* — William D Hutton, Jr.
*Assistant Examiner* — Charles R Nold
(74) *Attorney, Agent, or Firm* — Andrea E. Tran

(57) ABSTRACT

Methods for treating subterranean wells in which the producing formation is a carbonate comprise preparing a treatment fluid comprising either: (a) an aqueous solution of a multivalent-cation reacting polymer; (b) a solution comprising a fatty acid and an ethanolamine; (c) an aqueous acidic solution of one or more compounds whose calcium salts are insoluble; or (d) an aqueous solution comprising urea or alkane derivatives thereof or both and polyvinylpyrrolidone (PVP). The treatment fluid is placed in the well such that the solution contacts the carbonate formation at a pressure lower than the fracturing pressure. The treatment fluid is allowed to react with the carbonate formation, thereby depositing a film onto the formation surface or part of the formation surface. Then an acid solution is placed in the well such that the acid contacts the carbonate formation at a pressure lower than the fracturing pressure.

1 Claim, 12 Drawing Sheets

(56) References Cited

U.S. PATENT DOCUMENTS

| | | | | |
|---|---|---|---|---|
| 5,238,067 | A * | 8/1993 | Jennings, Jr. | C09K 8/62 166/307 |
| 5,385,741 | A | 1/1995 | Rinn et al. | |
| 6,203,709 | B1 | 3/2001 | Min et al. | |
| 6,989,102 | B1 | 1/2006 | Park et al. | |
| 7,527,103 | B2 * | 5/2009 | Huang | C09K 8/506 166/205 |
| 7,886,822 | B2 * | 2/2011 | Garcia-Lopez De Victoria | C09K 8/528 166/279 |
| 7,947,629 | B2 * | 5/2011 | Fuller | C09K 8/78 166/305.1 |
| 8,066,073 | B2 * | 11/2011 | Hutchins | C09K 8/685 166/279 |
| 2005/0026789 | A1 * | 2/2005 | Marakov | C09K 8/72 507/276 |
| 2005/0137095 | A1 * | 6/2005 | Cawiezel | C09K 8/74 507/240 |
| 2005/0178553 | A1 | 8/2005 | Harris | |
| 2007/0187096 | A1 * | 8/2007 | Pauls | C09K 8/74 166/280.1 |
| 2008/0121398 | A1 | 5/2008 | Cawiezel et al. | |
| 2008/0190609 | A1 | 8/2008 | Robb et al. | |
| 2009/0042748 | A1 * | 2/2009 | Fuller | C09K 8/78 507/203 |
| 2011/0067867 | A1 | 3/2011 | Reddy et al. | |
| 2011/0092393 | A1 | 4/2011 | Faust et al. | |
| 2013/0333892 | A1 * | 12/2013 | McClung, IV | E21B 43/26 166/308.3 |
| 2015/0322329 | A1 * | 11/2015 | Reyes | C09K 8/74 166/304 |

OTHER PUBLICATIONS

International Search Report issued in PCT/US2015/040314 dated Nov. 16, 2015; 5 pages.

Draget, et al., "Alginates from Algae", Biopolymers Online, DOI: 10.1002/3527600035, 2005, pp. 1-30.

Fang, et al., "Multiple Steps and Critical Behaviors of the Binding of Calcium to Alginate", The Journal of Physical Chemistry B, vol. 111, No. 10, 2007, pp. 2456-2462.

Grant, et al., "Biological interactions between polysaccharides and divalent cations: The egg-box model", FEBS Letters, vol. 32, Issue 1, May 15, 1973, pp. 195-198.

Ma, et al., "Alginate hydrogel-mediated crystallization of calcium carbonate", Journal of Solid State Chemistry, vol. 184, Issue 5, May 2011, pp. 1008-1015.

Zhao, et al., "Alginate modified nanostructured calcium carbonate with enhanced delivery efficiency for gene and drug delivery", Molecular BioSystems, vol. 8, 2012, pp. 753-759.

* cited by examiner

3% (●), 2% (♦), 1.5% (■), 1.0% (▲), and 0.5% alginate (x)

Untreated (●), 1% ALG/ 5% Urea treated (▲), and 1% ALG (■) treated Indiana limestone disks Untreated (●), 1% ALG/ 5% Urea treated (▲), and 1% ALG (■) treated $CaCO_3$ disks 1% ALG (a), 1% ALG/1% PVP (b), 1% ALG/5% Urea (c), 1% ALG/ 5% EU (d), 1% ALG/5% DMU (e), and 1% ALG/5% BHMU (f)

1000 rpm (▲), 500 rpm (■), and 60 rpm (♦)

Untreated limestone disk (♦) and 1% ALG treated limestone disk (■) at 150 °F and 15% HCl reaction fluid

COMPOSITIONS AND METHODS FOR TREATING SUBTERRANEAN FORMATIONS

BACKGROUND

The statements in this section merely provide background information related to the present disclosure and may not constitute prior art.

This disclosure relates to compositions and methods for treating subterranean formations, stimulation treatments in particular.

Stimulation treatments in subterranean wells may be performed to improve the rate at which hydrocarbons (or other valuable resources) are produced, maximize the total amount of hydrocarbons that are produced or both. Such treatments may be divided into two principal categories. Matrix stimulation treatments are those during which fluids are introduced or pumped into the well at rates and pressures that do not fracture the rock surrounding the wellbore. Fracturing treatments are those during which fluids are introduced or pumped into the well at rates and pressures that cause the rock surrounding the wellbore to fracture. The fractures may then propagate away from the wellbore and increase the surface area of rock available to the wellbore by orders of magnitude.

Fluids employed during stimulation treatments may contain acids that may dissolve and increase the permeability of producing formations. Hydrochloric acid may be used to stimulate carbonate formations, while hydrofluoric acid may be used to treat sandstone formations. Other organic acids such as formic acid and acetic acid may also have application.

Carbonates are sedimentary rocks deposited in a marine environment and are largely of biological origin. The nature of local deposition contributes to their extensive heterogeneity across all scales—from pores, to grains and to textures. Carbonate rocks may exhibit a complex texture and pore network resulting from their depositional history and subsequent diagenesis.

Matrix acidizing and fracture acidizing are conventionally used to release hydrocarbons in such formations, but the stimulation may be impeded by a lack of heterogeneity of carbonate surfaces. Surface heterogeneity favors the creation of a more complex network of conductive channels (or "wormholes") as the acid penetrates the formation, and may maximize production efficiency.

Hydrochloric acid (HCl) at a 15 wt % concentration, accompanied by a suitable level of corrosion inhibitor to reduce corrosion to completion and metallic tools, may be used in acid stimulation operations. The principal chemical reaction is shown in Eq. 1.

$$2HCl + CaCO_3 \rightarrow CaCl_2 + CO_2 + H_2O \quad \text{(Eq. 1)}$$

A number of difficulties may arise due to the high sensitivity of the entire carbonate formation, which by nature may be highly uneven in permeability distribution, to a strong mineral acid system. Notably, etching of the formation by the acid may be confined to locations that are already permeable. Highly permeable areas attract more acid flow due to decreased diffusion limitations, which in turn creates larger wormholes that consume more acid, leaving low-permeability areas untouched. Therefore, the network of wormholes may not be optimal and acid may be unnecessarily wasted.

Conventional acidizing fluids, such as hydrochloric acid or a mixture of hydrofluoric and hydrochloric acids, have high acid strength and may react quickly with fines and scale nearest the wellbore, and may have a tendency to corrode tubing, casing and downhole equipment, such as gravel pack screens and downhole pumps, especially at elevated temperatures. In addition, above 200° F. (93° C.), straight HCl is not recommended in some cases because of its destructive effect on the rock matrix. Due to the type of metallurgy, long acid contact times and high acid sensitivity of the formations, scale removal with hydrochloric acid and hydrochloric acid mixtures has been largely unsuccessful.

SUMMARY

In an aspect, embodiments relate to treatment fluid systems. The systems comprise a first fluid comprising either:
- an aqueous solution of a multivalent-cation reacting polymer;
- a solution comprising a fatty acid and an ethanolamine;
- an aqueous acidic solution of one or more compounds whose calcium salts are insoluble; or
- an aqueous solution comprising urea or alkane derivatives thereof or both, and polyvinylpyrrolidone (PVP). The systems further comprise a second fluid that comprises an acid.

In a further aspect, embodiments relate to methods for treating a subterranean well having a borehole and a carbonate formation with a fracturing pressure. A treatment fluid is prepared that comprises either:
- an aqueous solution of a multivalent-cation reacting polymer;
- a solution comprising a fatty acid and an ethanolamine;
- an aqueous acidic solution of one or more compounds whose calcium salts are insoluble; or
- an aqueous solution comprising urea or alkane derivatives thereof or both, and polyvinylpyrrolidone (PVP). The treatment fluid is placed into the well such that the solution contacts the carbonate formation at a pressure lower than the fracturing pressure. The treatment fluid is allowed to react with the carbonate formation, thereby forming a film onto the formation surface or parts of the formation surface. An acid solution is then placed in the well such that the acid contacts the carbonate formation at a pressure lower than the fracturing pressure.

In yet a further aspect, embodiments relate to methods for stimulating a subterranean well having a borehole and a carbonate formation having a fracturing pressure. A treatment fluid is prepared that comprises either:
- an aqueous solution of a multivalent-cation reacting polymer;
- a solution comprising a fatty acid and an ethanolamine;
- an aqueous acidic solution of one or more compounds whose calcium salts are insoluble; or
- an aqueous solution comprising urea or alkane derivatives thereof or both, and polyvinylpyrrolidone (PVP). A first acid solution is placed into the well such that the solution contacts the carbonate formation at a pressure lower than the fracturing pressure. The treatment fluid is placed into the well such that the treatment fluid contacts the carbonate formation at a pressure lower than the fracturing pressure. The treatment fluid is allowed to react with the carbonate formation, thereby forming a film onto the formation surface or parts of the formation surface. A second acid solution is then placed in the well such that the acid contacts the carbonate formation at a pressure lower than the fracturing pressure. Placement of the treatment fluid and the acid may be repeated until a desired amount of stimulation is achieved.

DETAILED DESCRIPTION

The present disclosure will be described in terms of treatment of vertical wells, but is equally applicable to wells of any orientation. The disclosure will be described for hydrocarbon-production wells, but it is to be understood that the disclosed methods can be used for wells for the production of other fluids, such as water or carbon dioxide, or, for example, for injection or storage wells. It should also be understood that throughout this specification, when a concentration or amount range is described as being useful, or suitable, or the like, it is intended that any concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each possible number along the continuum between about 1 and about 10. In other words, when a certain range is expressed, even if just a few specific data points are explicitly identified or referred to within the range, or even when no data points are referred to within the range, it is to be understood that the Applicants appreciate and understand that any and all data points within the range are to be considered to have been specified, and that the Applicants have possession of the entire range and all points within the range.

In this disclosure, the tubular body may be any string of tubulars that may be run into the wellbore and at least partially cemented in place. Examples include casing, liner, solid expandable tubular, production tubing and drill pipe.

The present disclosure reveals compositions and procedures for selectively passivating carbonate surfaces. Such carbonate surfaces may include calcite, aragonite, vaterite and dolomite.

Figure 1:
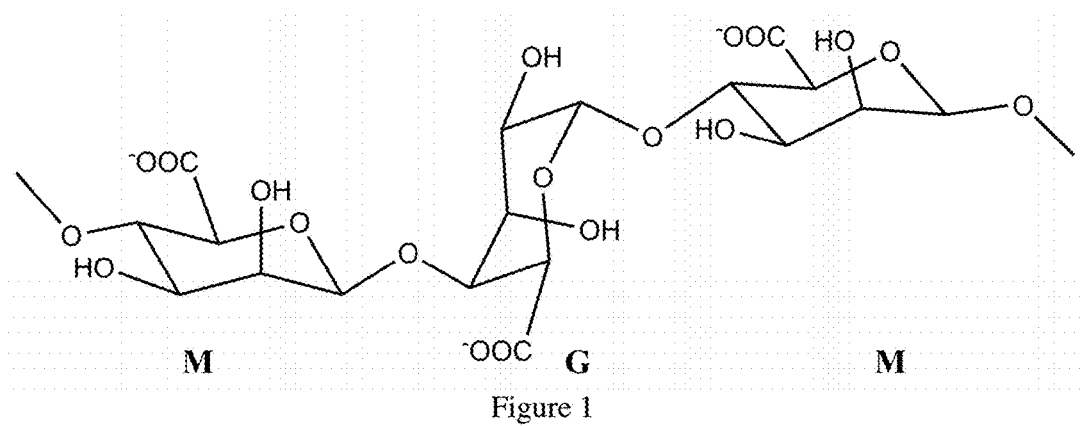
FIG. 1 is a schematic drawing of alginic acid building blocks, M and G, and their distribution.
Figure 2:
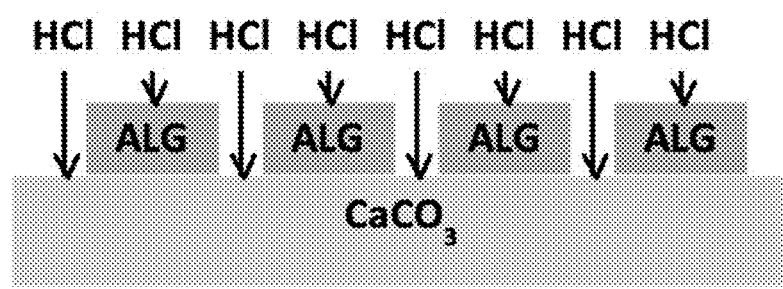
FIG. 2 is a drawing depicting the passivation of calcite surfaces by crosslinked algninic acid.

Compositions may comprise "multivalent cation reacting polymer" as used herein encompasses polymer that react in presence of multivalent cation such as calcium. Non limiting examples are caraggenan, pectin, carboxylate containing polymer, such as carboxymethylcellulose (CMC), carboxymethyl hydroxypropyl guar (CMHPG), carboxymethyl hydroxyethyyl guar (CMHEG), xanthan, diutan, carboxymethylhydroxylcellulose (CMHEC), carboxymethyl starch, partially hydrolyzed polyacrylamide (PHPA), acrylic acid and its derivatives. In embodiments the multivalent-cation reacting polymer. In embodiments, the compositions may comprise alginic acid (ALG), a biopolymer readily available from brown algae. Alginates are heterogeneous in their composition, which varies with different algal sources and by which part of the seaweed the alginate was harvested from. The polysaccharide has two building blocks: D-mannuronic (M) and L-guluronic acid (G), a schematic drawing of which is shown in FIG. 1. The M-to-G ratio, as well as the block sequencing, may affect the physical properties of the polymer. ALG with a counterion to the carboxylate group forms a viscous solution in an aqueous solvent. However, introduction of multivalent cations may result in crosslinking of the linear polymer to form thick, translucent gels. Such a protocol involves using ALG to protect calcite surfaces for at least a two-fold effect: (1) restricting acid access to the carbonate surface; and (2) causing selective etching. FIG. 2 shows a schematic depiction of how adhesion of ALG to calcite surface sites may cause passivation to parts of the surface while allowing HCl to access other, uncovered parts. The presence of calcium cation, produced live by acid etching on calcite, forms a more viscous crosslinked gel with ALG.

The M-to-G ratio may be between 0.15 and 2.00. The M-to-G block sequencing may vary between MMMM-MMM, GGGGGGG and MGMGMG. Furthermore, the molecular weight of the alginates may be between 5,000 and 800,000.

Further compositions may comprise a fatty acid and an ethanolamine. Fatty acid molecules have the basic chemical formula $CH_3(CH_2)_n COOH$, and possess a hydrophilic acidic end and a hydrophobic alkyl end. When they contact a calcium carbonate surface, the acidic end may become affixed to the surface. Without wishing to held to any particular theory, the interaction may result from an electrostatic attraction between $Ca^{2+}$ and $RCOO^-$, forming a film comprising the calcium salt of the fatty acid. Suitable fatty acids include, for example, stearic acid, palmitic acid, behenic acid, lauric acid, erucic acid and oleic acid. The ethanolamine may be monoethanolamine, diethanolamine, or triethanolamine or combinations thereof.

Yet a further composition may comprise compounds whose calcium salts are insoluble. Without wishing to be held to any particular theory, when these compounds contact a calcium carbonate surface, they react to form a calcium salt that forms a protective coating that diverts acid to less permeable regions. Such compounds may include sodium sulfate, sodium phosphate dibasic, sulfamic acid, sodium-4-hydroxybenzenesulfonate, oxalic acid, tetrapotassium pyrophosphate, potassium periodate or potassium phosphate monobasic or combinations thereof. The concentration of the compounds whose calcium salts are insoluble may be between 0.05% and 30.0%, or between 0.10% to 15.0%, or between 0.10% to 7.50%, or between 0.10% to 2.00% by weight.

Yet a further composition may comprise an aqueous solution comprising urea, alkane derivatives thereof or both, and polyvinylpyrrolidone (PVP). The concentration of polyvinylpyrrolidone (PVP) may be in the range of from 0.5 wt % to 7.5 wt %, or 0.75 wt % to 5.0 wt %, or 1.0 wt % to 2.5 wt %.

The term "acid" as used herein encompasses mineral and organic acids. Examples of mineral acids are hydrochloric acid (HCl), nitric acid, phosphoric acid, sulfuric acid, boric acid, hydrofluoric acid, hydrobromic acid, perchloric acid, or derivatives, and mixtures thereof. The acid may be transported to a wellsite, the acid having a concentration between 28 wt % and 45.7 wt %. The acid may then be diluted to a treatment concentration before providing the oilfield treatment fluid to the high-pressure pump. When HCl is used, the acid solution may contain HCl at concentrations between 7.5 wt % and 28 wt %.

Examples of organic acids are formic acid, citric acid, acetic acid, glycolic acid, dicarboxylic acids (including oxalic acid, malonic acid, succinic acid, glutaric acid, adipic acid, pimelic acid and the like), tricarboxylic acids, aminocarboxylic acids, chloroacetic acid, hydroxyacetic acid and mixtures thereof may also have application. Organic acid derivatives may also be considered. For example, a derivative of acid may be methanesulfonic acid or its alkane, benzene or naphthalene derivatives. When organic acids are used, their concentration may range between 5.0 wt % and 30 wt %.

In an aspect, embodiments relate to treatment fluid systems. The systems comprise a first fluid comprising either:
  an aqueous solution of a multivalent-cation reacting polymer;
  a solution comprising a fatty acid and an ethanolamine;
  an aqueous acidic solution of one or more compounds whose calcium salts are insoluble; or
  an aqueous solution comprising urea or alkane derivatives thereof or both, and polyvinylpyrrolidone (PVP). The systems further comprise a second fluid that comprises an acid. Such systems may be used to modify the nature of carbonate mineral surfaces.

In a further aspect, embodiments relate to methods for treating a subterranean well having a borehole and a carbonate formation with a fracturing pressure. A treatment fluid is prepared that comprises either:
  an aqueous solution of a multivalent-cation reacting polymer;
  a solution comprising a fatty acid and an ethanolamine;
  an aqueous acidic solution of one or more compounds whose calcium salts are insoluble; or
  an aqueous solution comprising urea or alkane derivatives thereof or both, and polyvinylpyrrolidone (PVP). The treatment fluid is placed into the well such that the solution contacts the carbonate formation at a pressure lower than the fracturing pressure. The treatment fluid is allowed to react with the carbonate formation, thereby forming a film onto the formation surface. An acid solution is then placed in the well such that the acid contacts the carbonate formation at a pressure lower than the fracturing pressure.

The treatment fluid may be allowed to contact the carbonate surface for periods up to one hour.

In yet a further aspect, embodiments relate to methods for stimulating a subterranean well having a borehole and a carbonate formation having a fracturing pressure. A treatment fluid is prepared that comprises either:
  an aqueous solution of a multivalent-cation reacting polymer;
  a solution comprising a fatty acid and an ethanolamine;
  an aqueous acidic solution of one or more compounds whose calcium salts are insoluble; or
  an aqueous solution comprising urea or alkane derivatives thereof or both, and polyvinylpyrrolidone (PVP). A first acid solution is placed into the well such that the solution contacts the carbonate formation at a pressure lower than the fracturing pressure. The treatment fluid is placed into the well such that the treatment fluid contacts the carbonate formation at a pressure lower than the fracturing pressure. The treatment fluid is allowed to react with the carbonate formation, thereby forming a film onto the formation surface. A second acid solution is then placed in the well such that the acid contacts the carbonate formation at a pressure lower than the fracturing pressure. Placement of the treatment fluid and the acid may be repeated until a desired amount of stimulation is achieved.

The treatment fluid may be allowed to contact the carbonate surface for periods up to one hour.

For each aspect, the multivalent-cation reacting polymer may be present at a concentration between 0.1% and 3.0% by weight of the solution.

For each aspect, the ethanolamine may comprise monoethanolamine, diethanolamine, or triethanolamine or combinations thereof.

For each aspect, the fatty acid may have the chemical formula $CH_3(CH_2)_nCOOH$, wherein n is between 10 and 24 inclusive, and the fatty acid is present at a concentration between 1.0% and 2.5% by weight. The fatty acids may comprise stearic acid, palmitic acid, behenic acid, lauric acid, erucic acid or oleic acid or combinations thereof.

For each aspect, the compounds whose calcium salts are insoluble may comprise sodium sulfate, sodium phosphate dibasic, sulfamic acid, sodium-4-hydroxybenzenesulfonate, oxalic acid, tetrapotassium pyrophosphate, potassium periodate or potassium phosphate monobasic or combinations thereof, wherein the compounds are present at a concentration between 1.0% and 10% by weight.

For each aspect, the treatment fluid may further comprise sulfonic acid or derivatives thereof or both. Fluid formulations containing methanesulfonic acid, or one of its alkane or benzene or naphthalene derivatives, or mixtures thereof, may have improved thermal stability. These materials may be present at concentrations between 0.1% and 1.0% by weight.

When the acid solution is made of hydrochloric acid, the solution may contain HCl at concentrations between 7.5 wt % and 28 wt %. The hydrochloric acid solution may further comprise urea or one or more urea derivatives, or both, at concentrations between 7.0 wt % and 46 wt %.

EXAMPLES

The following examples are provided to more fully illustrate the disclosure. These examples are not intended to limit the scope of the disclosure in any way.

Example 1

Solutions of sodium alginate (Na-ALG) were prepared by blending sodium alginate (available from Acros—Product No. MFCD00081310) with deionized water to obtain a desired weight concentration (0.1%-3.0%). A Waring blender was used. Blending powdered ALG with water produced essentially homogeneous mixtures within 30 min. Attention was paid to the sides of the blender cup, as the ALG powder tended to stick to the sides of the vessel and avoid dissolution. Using a stirring bar, sonication bath, or simply shaking by hand was not effective.

Addition of acid (e.g. HCl) to solutions of sodium alginate caused a phase change of the alginic acid, owing to protonation of the carboxylic group. Tests were conducted by adding concentrated HCl (37%) to ALG solutions such that the final HCl concentration was 15%. While blending, addition of HCl converted the homogeneous polymer fluids into clumpy, translucent gels.

Addition of calcium ($CaCl_2$) to the ALG solutions lead to immediate crosslinking of the linear polymer to form solid and translucent gels. Different addition methods resulted in different gel structures. Introduction of $CaCl_2$ dropwise caused "beads" of cross-linked ALG to form; introduction of a $CaCl_2$ stream under low rotation caused "noodles" of cross-linked ALG to form; introduction of $CaCl_2$ while under high rotation caused "clumps" of cross-linked ALG to form. In all cases, high ALG-to-Ca weight ratios were employed (ALG:Ca: up to $10^{3:1}$). Continuous addition of 1% $CaCl_2$ while blending caused the ALG to bind all available $Ca^{2+}$ ions to form a solid gel with no liquid fraction. The mixture reached a saturation point when no additional $Ca^{2+}$ could be adsorbed, causing a liquid fraction to appear when more aqueous $CaCl_2$ was added. For effective treatment of carbonate surfaces, it may be optimal to supply ALG and $Ca^{2+}$.

Example 2

Figure 3:
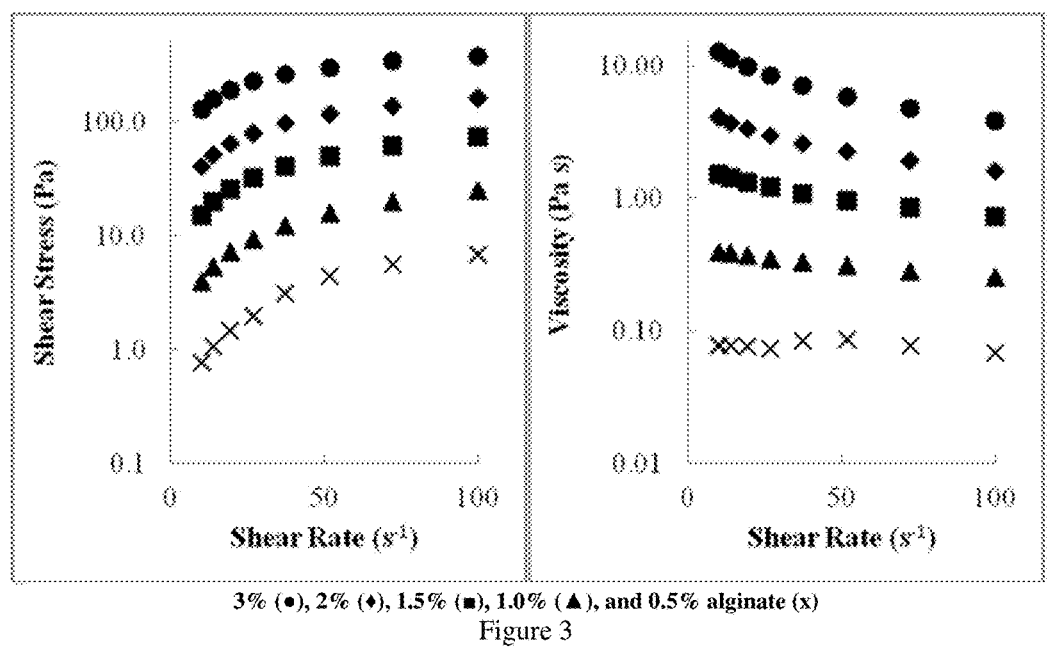
FIG. 3 presents plots showing the shear stress and viscosity of various alginate/water solutions as a function of shear rate.
Figure 4:
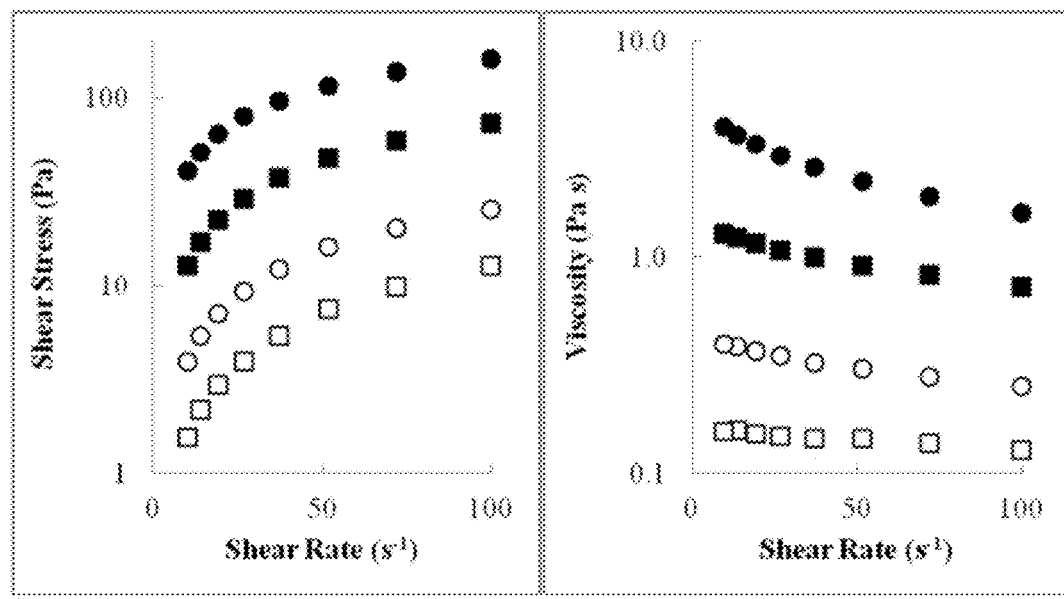
FIG. 4 presents plots showing the shear stress and viscosity of aqueous solutions of alginates from two different suppliers.

Rheological measurements of alginate solutions were conducted to determine how the viscosity changed by varying the ALG concentrations as well as the effect of different additives. FIG. 3 shows the shear stress and viscosity as a function of shear rate for solutions containing from 0.5 wt % to 3.0 wt % ALG in water. As predicted by most polymer solutions, the shear stress and viscosity increased with increasing ALG concentration. Rheological tests were also conducted on ALG solutions made from alginate obtained from different suppliers. FIG. 4 compares the shear stress and viscosity of alginate solutions from Acros and Sigma-Aldrich. A decrease in viscosity was observed in the Sigma-Aldrich samples. The physical properties were highly dependent on the algae source as well as the molecular weight and the M and G block sequencing. The M to G ratio is dependent on the algae species and what part of the plant the alginate was harvested from (stem versus leaf). In FIG. 4, data from the Acros and Sigma-Aldrich samples are depicted as circles and squares, respectively. Open squares and circles show data from 1 wt % alginate solutions, and closed squares and circles show data from 2 wt % alginate solutions.

Example 3

Indiana limestone disks of 1-in. (2.54-cm) diameter and 0.25-in. (0.64-cm) thickness were treated by various ALG-containing solutions described below.

ALG: Disk submersion in 1 wt % ALG solution, vacuum chamber for 2 h.

ALG/$CaCl_2$: Disk submersion in 1 wt % ALG solution, vacuum chamber for 2 h, subsequent disk submersion in 1 wt % $CaCl_2$, vacuum chamber for 2 h.

$CaCl_2$/ALG: Disk submersion in 1 wt % $CaCl_2$ solution, vacuum chamber for 2 h, subsequent disk submersion in 1 wt % ALG, vacuum chamber for 2 h.

ALG-$Na_2SO_4$: Disk submersion in 1 wt % ALG/1 wt % $Na_2SO_4$ solution, vacuum chamber for 2 h.

ALG-LUDOX™: Disk submersion in 1 wt % ALG/1 wt % LUDOX™ HSA solution (colloidal silica available from WR Grace & Co.), vacuum chamber for 2 h.

ALG-$Na_2SiO_3$: Disk submersion in 1 wt % ALG/1 wt % $Na_2SiO_3$ solution, vacuum chamber for 2 h.

The solutions were placed in a vacuum chamber to facilitate solution saturation into the pore structures before being immersed in 15 wt % HCl. These treatments often left a gel layer of crosslinked ALG surrounding the disk. Such a layer was susceptible to physical damage; therefore, care was taken to limit testing to samples with structurally sound gel layers and compare those results across different treatment methods. The treated cores were then exposed to 30 g of 15 wt % HCl for 10 min at ambient temperature, and the limestone weight loss (Eq. 2) was recorded, allowing a comparison among the different treatment methods. Table 1 shows the percent limestone mass loss as a function of the treatment method.

$$\% \text{ Loss} = \frac{Mass_{initial} - Mass_{final}}{Mass_{initial}} \times 100 \qquad \text{(Eq. 2)}$$

The passivation factor given in Table 1 is defined as the reciprocal of the mass loss ratio with a given ALG-containing solution as compared to ALG-free solution.

TABLE 1

Percent mass losses and passivation factors of Indiana limestone pre-treated with ALG-containing solutions after HCl reaction.

| Fluid Formation | Mass Loss | Passivation Factor |
| --- | --- | --- |
| ALG | 7.1% | 14.2 |
| ALG/$CaCl_2$ | 25.1% | 4.0 |
| $CaCl_2$/ALG | 11.5% | 8.7 |
| ALG-$Na_2SO_4$ | 41.9% | 2.4 |
| ALG-LUDOX ™ | 5.7% | 17.5 |
| ALG-$Na_2SiO_3$ | 91.1% | 1.1 |
| No Treatment | 100.0% | 1.0 |

Each ALG-containing solution demonstrated resistance to limestone mass loss arising from strong mineral acid etching. While the effect with ALG-silicate nanoparticles was marginal, the passivation factor was as high as 17.5 in the case of an ALG-LUDOX™ mixture.

Example 4

In order to measure transient reaction rates, a simple eudiometer apparatus was constructed to measure the volume of $CO_2$ evolved during limestone reactions with HCl. The Indiana limestone disks were treated by an ALG solution before being immersed in 30 g of 15% HCl for 10 min. The treatment solutions are listed below.

1% ALG: Disk submersion in 1% HCl for 5 seconds, disk submersion in 1% ALG solution, vacuum chamber for 2 hours.

1% ALG/1% PVP: Disk submersion in 1% HCl for 5 seconds, disk submersion in 1% ALG/1% polyvinylpyrrolidone solution, vacuum chamber for 2 hours.

1% ALG/5% Urea: Disk submersion in 1% HCl for 5 seconds, disk submersion in 1% ALG/5% urea solution, vacuum chamber for 2 hours.

1% ALG/5% EU: Disk submersion in 1% HCl for 5 seconds, disk submersion in 1% ALG/5% ethylene urea solution, vacuum chamber for 2 hours.

1% ALG/5% DMU: Disk submersion in 1% HCl for 5 seconds, disk submersion in 1% ALG/5% N,N'-dimethyl urea solution, vacuum chamber for 2 hours.

1% ALG/5% BHMU: Disk submersion in 1% HCl for 5 seconds, disk submersion in 1% ALG/5% N,N'-bis(hydroxyl methyl) urea solution, vacuum chamber for 2 hours.

Figure 5:
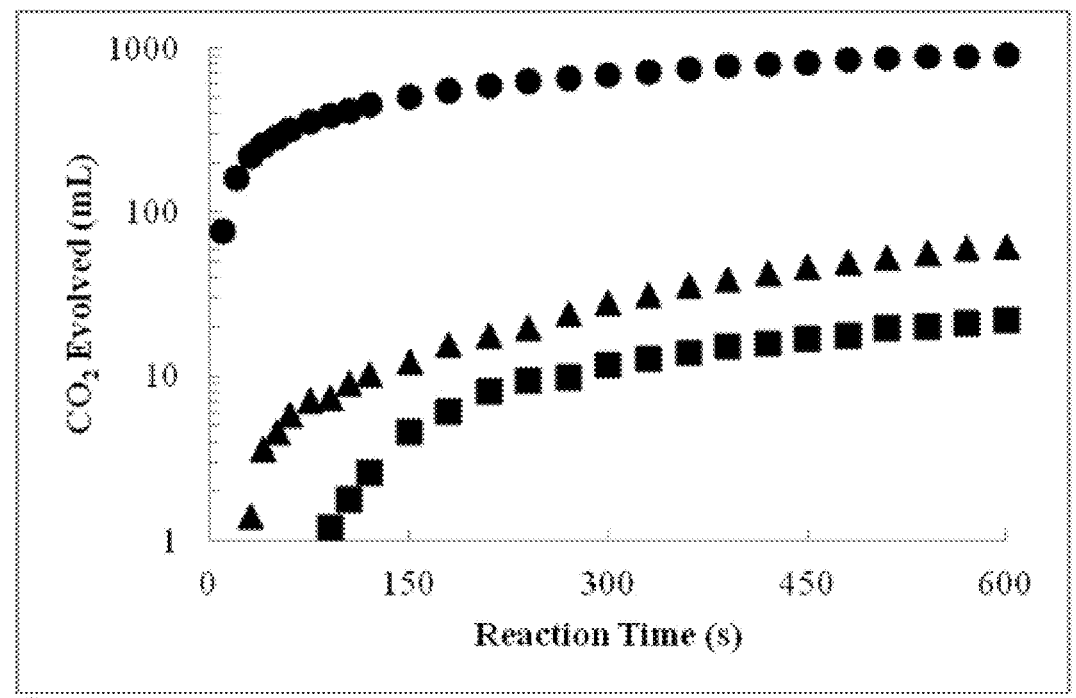
FIG. 5 is a plot showing the volume of $CO_2$ evolved when Indiana limestone disks (untreated and treated with alginate) are contacted by HCl.

The activated $Ca^{2+}$ ions as a result of HCl etching were immediately available for ALG cross-linking. The evolution of $CO_2$ was measured at different times as the gas replaced water in the eudiometer tube or a graduated cylinder. No corrections were made for $H_2O$ vapor pressure, barometric pressure, temperature, or $CO_2$ solubility in $H_2O$. $CO_2$ volumes were measured every 10-15 s up to 120 s of reaction, then measured every 30 s thereafter, until 600 s had elapsed. After 600 s, the limestone disks were removed from the HCl solution and rinsed with $H_2O$ to quench the reaction. FIG. 5 shows the evolution of $CO_2$ as a function of reaction time for various treated cores. The generated $CO_2$ volumes varied, showing a strong passivation effect of ALG on calcite.

Figure 6:
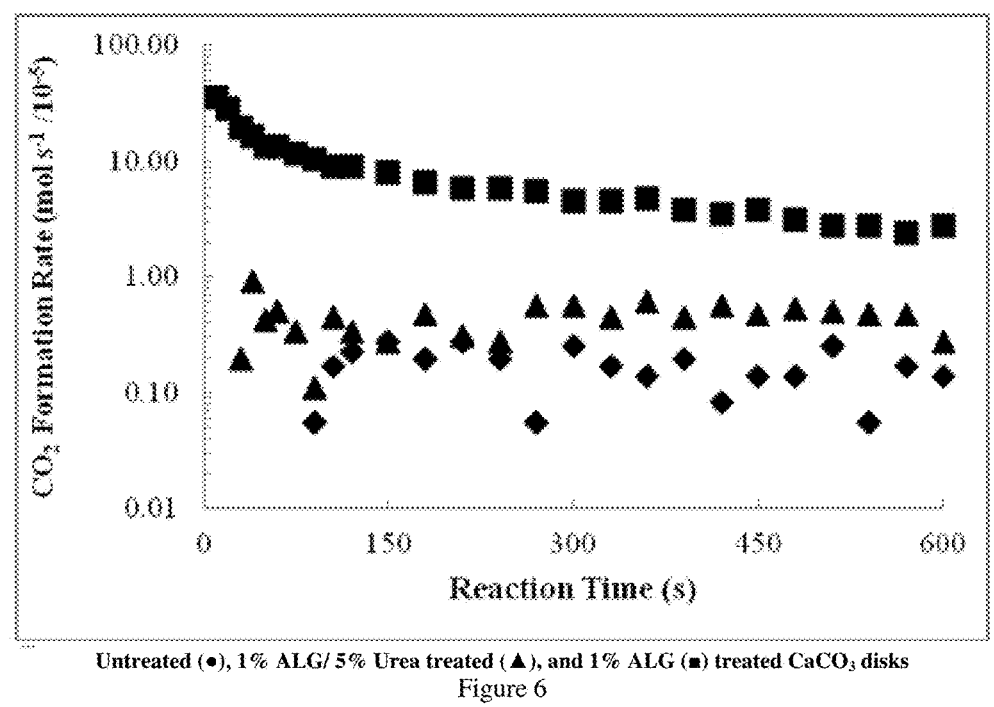
FIG. 6 is a plot showing the rate at which $CO_2$ forms when Indiana limestone disks (untreated and treated with alginate) are contacted by HCl.

By converting the volume of evolved $CO_2$ into moles, using the density of a gas at 20° C. (24 L/mol), it was possible to calculate the rates of $CO_2$ evolution in moles as a function of time (Eq. 3). FIG. 6 presents the rate of $CO_2$ formation as a function of reaction time for untreated limestone, as well as two ALG-treated limestone disks. Initial rates of $CO_2$ formation on the untreated disk exceeded $3 \times 10^{-4}$ mol $s^{-1}$, then decreased with time to approximately $3 \times 10^{-5}$ mol $s^{-1}$. The decrease in formation rate was caused by decreasing acid concentration and decreasing limestone surface availability. The ALG and ALG/Urea treated disks had much lower rates, approximately 2 and $4 \times 10^{-6}$ mol $s^{-1}$, respectively. These rates were largely constant throughout the entire reaction time. Acid consumption was correspondingly lower during reactions with treated disks, as shown in Table 2.

TABLE 2

Final solution concentrations of HCl, disk weight losses and λs for Indiana limestone disks treated with various alginate formulations.

$$\text{Rate} = \frac{\Delta \text{Mole}}{\Delta \text{Time}} = \frac{\text{Mole}_{x+\Delta x} - \text{Mole}_x}{\text{Time}_{x+\Delta x} - \text{Time}_x} \quad \text{(Eq. 3)}$$

| Treatment | Final HCl (wt %) | Weight Loss (%) | $\lambda_{120+}$ |
|---|---|---|---|
| Untreated | 3.9 | 65.3 | 1 |
| 1% ALG | 13.7 | 2.8 | 28 |
| 1% ALG/1% PVP | 13.7 | 4.5 | 20 |
| 1% ALG/5% Urea | 13.2 | 5.1 | 12 |
| 1% ALG/5% EU | 13.8 | 4.2 | 44 |
| 1% ALG/5% DMU | 13.8 | 3.4 | 32 |
| 1% ALG/5% BHMU | 13.8 | 4.1 | 16 |

Figure 7:
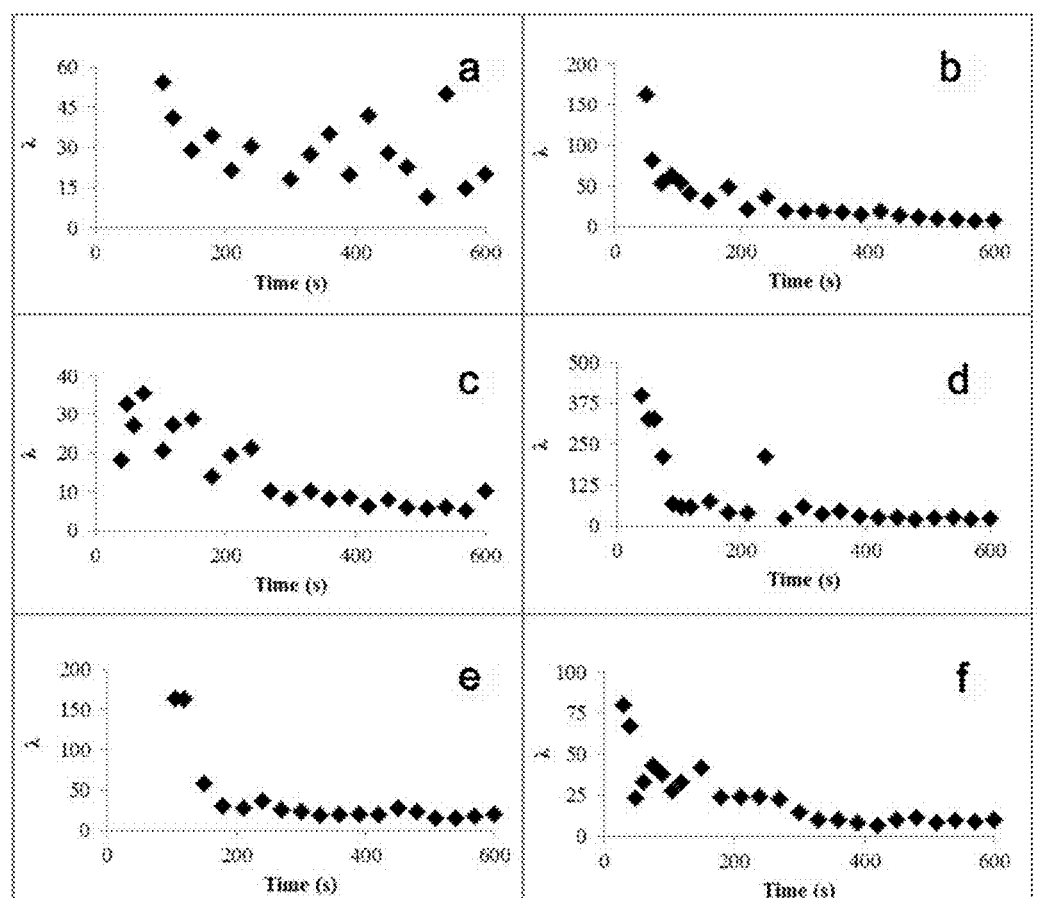
FIG. 7 is a series of plots showing passivation factors as a function of time for calcite surfaces treated with various alginate compositions.

A passivation factor can be calculated which allows direct comparison of passivation enhancement between different treatment methods. The passivation factor, λ, is defined as the ratio of the rate of $CO_2$ formation at time x for an untreated disk and the rate at time x for a treated disk, as shown in Eq. 4. FIG. 7 shows λ as a function of reaction time for various treatment methods, which are described below. λ was initially very high as the diffusion of acid through the gel layer was slow, causing a low rate of $CO_2$ formation. At longer reaction times, λ was fairly constant with time as $CO_2$ formation for the treated and untreated disks trends towards steady state. An average λ was calculated from all the λ values after 120 s of reaction. λ values before 120 min were high and artificially increased the average values. Average λ values allowed for a quick and simple comparison of passivation enhancement among varying treatment methods, as given in Table 2.

$$\lambda = \frac{\text{Rate}_{t=x}^{Untreated}}{\text{Rate}_{t=x}^{Treated}} \quad \text{(Eq. 4)}$$

Example 5

Rotating disk experiments (RDE) were conducted to obtain kinetic rate parameters for acid consumption. RDE is a traditional method used to determine rate parameters, both in the mass transfer and reaction rate limited regimes. Disks were pretreated in 1% HCl prior to adhesion to the RDE spindle with epoxy. The core and spindle were then submersed in 1% ALG for 2 h under vacuum. The ALG film was visible at the top surface of the disk. Three experiments were conducted at 60, 500 and 1000 rpm each at 150° F. (65.6° C.) with 15 wt % HCl as the reaction fluid. Fluid aliquots were taken every minute for five minutes. The fluid was then tested for Ca content via inductively coupled plasma (ICP) analysis.

Figure 8:
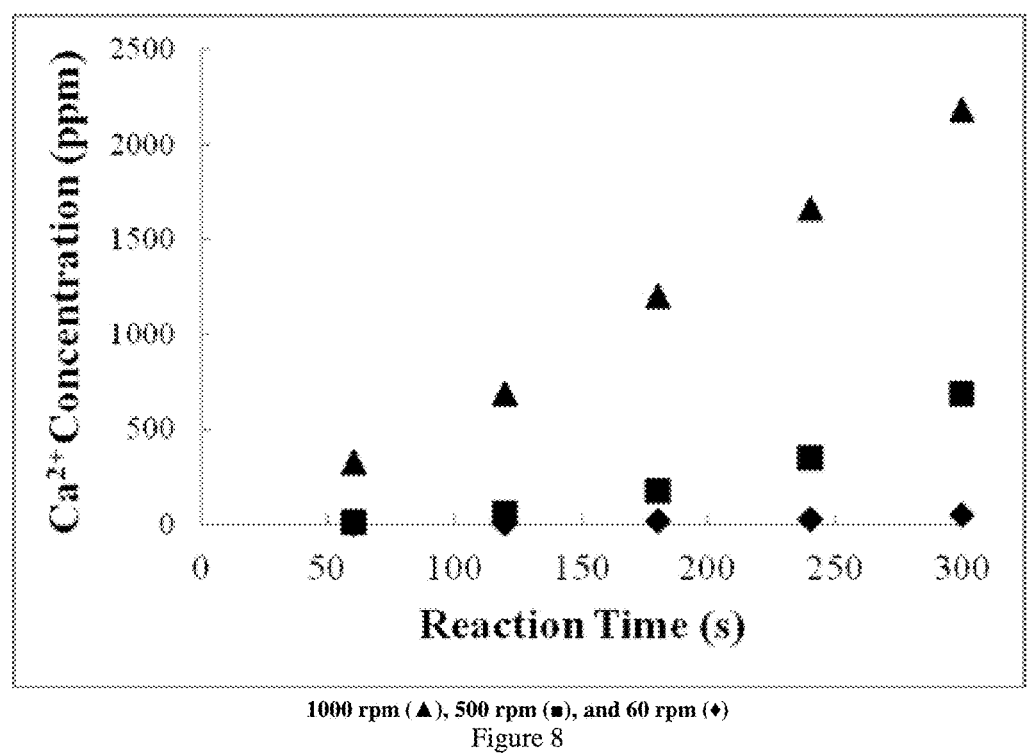
FIG. 8 is a plot showing the effect of rotational speed on the reactivity of limestone cores during rotating disk experiments.
Figure 9:
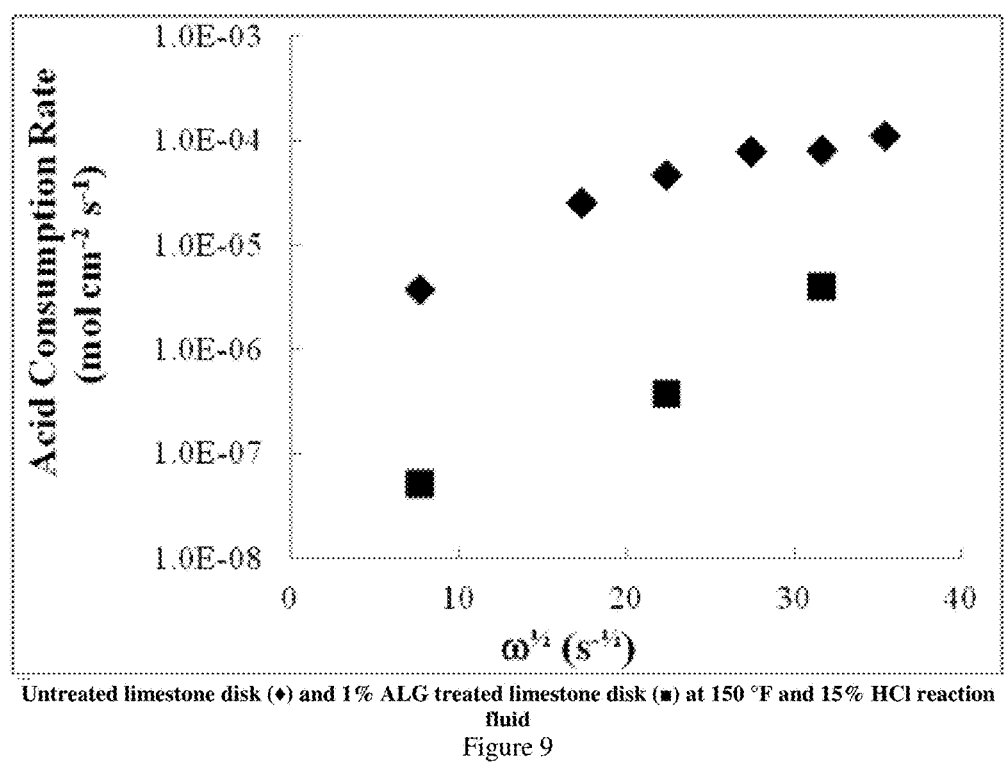
FIG. 9 is a plot showing the acid consumption rate as a function of rotational speed during rotating disk experiments.

The gel remained intact on the surface of the disk, while etching of the disk edges occurred with increasing shear rate as the rotational speed increased. The greater amount of etching at higher rpm was also evident as the Ca concentration increased both with reaction time and rpm (FIG. 8). The acid consumption rate was calculated from the amount of Ca produced. As shown in FIG. 9, this rate increased with the square root of the rotational velocity, indicating the experiment is within the mass transfer limited regime. For comparison, the consumption rate of an untreated core at the same reaction conditions was overlayed with the 1% ALG treated experiments. A two orders of magnitude decrease in the acid consumption rate was observed, that was evident by observing the "leveling off" of the consumption rate for rotational velocities after approximately 25 $s^{-1/2}$. The effect of the ALG-coating, resulted in total surface area reduction, outweighed the rate of temperature increase.

Example 6

Stearic acid (SA), like other fatty acids, possesses both a hydrophilic acid end and a hydrophobic alkyl end. Theoretically, the acidic end will affix to the calcium carbonate surface (potentially by the electrostatic attraction between $Ca^{2+}$ and $RCOO^-$) and form a calcium stearate (CaSt) film that is water insoluble. Other fatty acids may work in an identical manner, thus stearic acid, palmitic acid, behenic acid, lauric acid, and oleic acid were tested.

A 1 wt % SA/DEA (diethanolamine) solution was applied to one-half of the surface of a rectangular Indiana limestone sample using an ordinary cotton swab. A sufficient quantity was used to thoroughly coat the surface, but not so much as to allow fluid run-off when the core was tilted. Upon submersion in 1% HCl, a difference in reaction rate was observed between the treated and untreated halves. In fact, the treated face had no visible bubbles of $CO_2$ evolution. After a period of up to 15 min, the treated surface turned white; an opaque film of stearic acid adhered to the surface as the DEA solvent washed off. This film was not calcium stearate, but pure stearic acid. Due to the higher solubility of SA in DEA over $H_2O$, the solute is driven to the surface as the outer DEA layers diffuse into aqueous solution. As the reaction continued, $CO_2$ bubbles agitated the edges of the film sufficiently to lift off in pieces.

In addition, other analogs with similar alkyl chains were examined. In order to make a direct comparison between these compounds, standard solutions were prepared in DEA at concentrations of 1 wt % and 2.5 wt %. Protection time was measured visually as the time required for a treated core to react at the same rate as an untreated core (that is, the time for a portion of the treated surface to be washed off/removed when submerged in acid). Each core was a rectangular Indiana Limestone specimen, prepared by applying a small quantity of solution with a cotton swab. Pure solvent (DEA) was used as a reference.

TABLE 3

Summary of fatty acid/DEA solution interactions with HCl. The first column represents protection time in seconds, while the second is the relative passivation factor compared to pure DEA.

|  |  | 1% HCl/$H_2O$ | | 5% HCl/$H_2O$ | |
| --- | --- | --- | --- | --- | --- |
|  | Pure DEA | 20 | 1.0 | 20 | 1.0 |
| 1% | Stearic (18C) | 720 | 36.0 | 20 | 1.0 |
|  | Palmitic (16C) | 480 | 24.0 | 120 | 6.0 |
|  | Behenic (22C) | 720 | 36.0 | 20 | 1.0 |
|  | Lauric (12C) | 180 | 9.0 | 20 | 1.0 |
|  | Oleic (18C) | 240 | 12.0 | 90 | 4.5 |
| 2.5% | Stearic (18C) | 1250 | 62.5 | 240 | 12.0 |
|  | Palmitic (16C) | 945 | 47.3 | 40 | 2.0 |
|  | Behenic (22C) | 1200 | 60.0 | 40 | 2.0 |
|  | Lauric (12C) | 410 | 20.5 | 60 | 3.0 |
|  | Oleic (18C) | 525 | 26.3 | 60 | 3.0 |

Example 7

An Indiana limestone core was placed on a hot plate at approximately 200° F. (93° C.), and treated by applying 5 wt % HCl droplets on the surface that led to $CO_2$ gas generation and an excess of calcium cations left on the surface as the water solvent and reaction product penetrated into the pore structure. Then, a 1 wt % aqueous sodium stearate solution was applied to the reacted surface. Upon drying, droplets of 15 wt % HCl were applied to the modified surface. The droplets remained largely dome-shaped due to the hydrophobic nature of the calcium stearate monolayer. This process lasted for up to 120 s, after which the acid eventually found its way through existing pinholes in the film and reacted with the limestone. This time period was sufficient to generate considerable heterogeneity on the carbonate surface.

Example 8

In a two-stage reaction, a rectangular limestone core was submerged in 5 wt % HCl/10 wt % $Na_2SO_4$ for 3 minutes, and then submerged in pure 5 wt % HCl for 5 min. After the first treatment, there was a uniform white mask covering the surface where the main acid etching reaction took place. After contacting 5 wt % HCl for a period of 5 min, small pockets began to develop and the HCl started to penetrate through the mask reacting with limestone underneath. Due to the isotropic nature of the reaction between HCl and $CaCO_3$, the proton may have functioned in a manner similar to a molecular drill into the core, accompanied by undercutting into areas underneath the mask, the integrity of which was eventually compromised.

Figure 10:
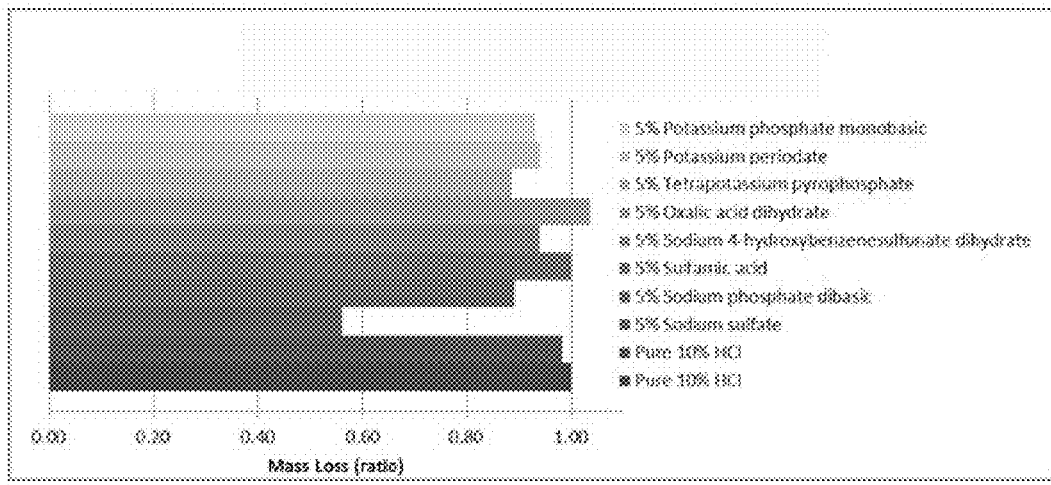
FIG. 10 is a plot showing the mass of calcite lost during a two-stage reaction test for various salt additives at a concentration of 5 wt %, normalized by the mass lost during a 10 wt % HCl pure acid treatment.

In addition, a number of other compounds were screened. Chosen for their potential ability to form insoluble calcium salts, these included: sodium sulfate, sodium phosphate dibasic, sulfamic acid, sodium 4-hydroxybenzenesulfonate, oxalic acid dehydrate, tetrapotassium pyrophosphate, potassium periodate, potassium phosphate monobasic, Arsenazo III and phenol red. While some of these tests were limited to dropping a dilute solution of salt on the surface and then reacting with acid, others were done more thoroughly. For those done more thoroughly, the test consisted of a two-stage treatment. First, cores were submerged in a 10 wt % HCl-5 wt % $Na_2SO_4$ solution for 2 min, then transferred to a 15 wt % HCl bath for 2 additional min. Cores were weighed before reaction, and after oven-drying. The concept is that the core develops a protective coating during the first stage, and then benefits from some level of protection during the second stage. The normalized mass losses for limestone specimens coated with various compounds are shown in FIG. 10.

Sodium sulfate appeared to be the most effective masking material. There was moderate fluctuation for other compounds, but this may have been due to the inherent acidity/basicity of those compounds. Irrespective of the actual mechanism that made sulfate function better than other salts, it was a promising candidate for surface masking and was chosen for further tests.

Fluid formulations containing methanesulfonic acid, or one of its alkane or benzene or naphthalene derivatives, or mixtures thereof, may have improved thermal stability. These materials may be present at concentrations between 0.1% and 1.0% by weight.

Example 9

The reacting core surface profile was evaluated as the $CaSO_4$ mask developed over time. Cores were photographed during various stages of the treatment, then dried and measured for both mass and width. Tests were performed by submerging Indiana limestone disks (1-in [2.54-cm] D, ⅛-in. [0.32-cm] H) in 30 mL of solution (1 wt %, 5 wt %, 10 wt %, and 15 wt % $Na_2SO_4$ in 15 wt % HCl) with brief pauses for photographs at 0, 15, 30, 45, 60, 90, 120, 210, 300, 450, and 600 s. A second round of tests was performed in 0 wt %, 0.5 wt %, 1 wt %, and 2 wt % $Na_2SO_4$ in 15 wt % HCl with photographs at 0, 30, 60, 120, 300, and 600 s.

Cores were held vertically upon removal from the treatment fluids to allow excess liquid to run off the surface. Despite this, some acid remained and reacted on the surface during the pauses, thus creating some experimental uncertainty.

Figure 11:
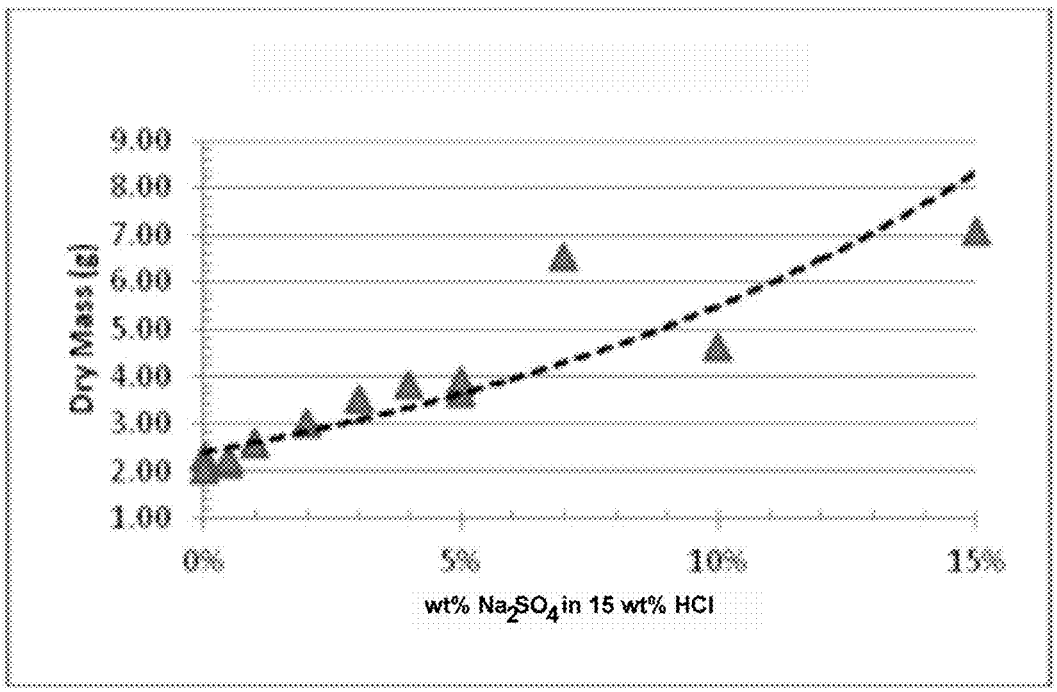
FIG. 11 is a plot showing the effect of $Na_2SO_4$ concentration on the mass of air dried calcite specimens treated with 15 wt % HCl.
Figure 12:
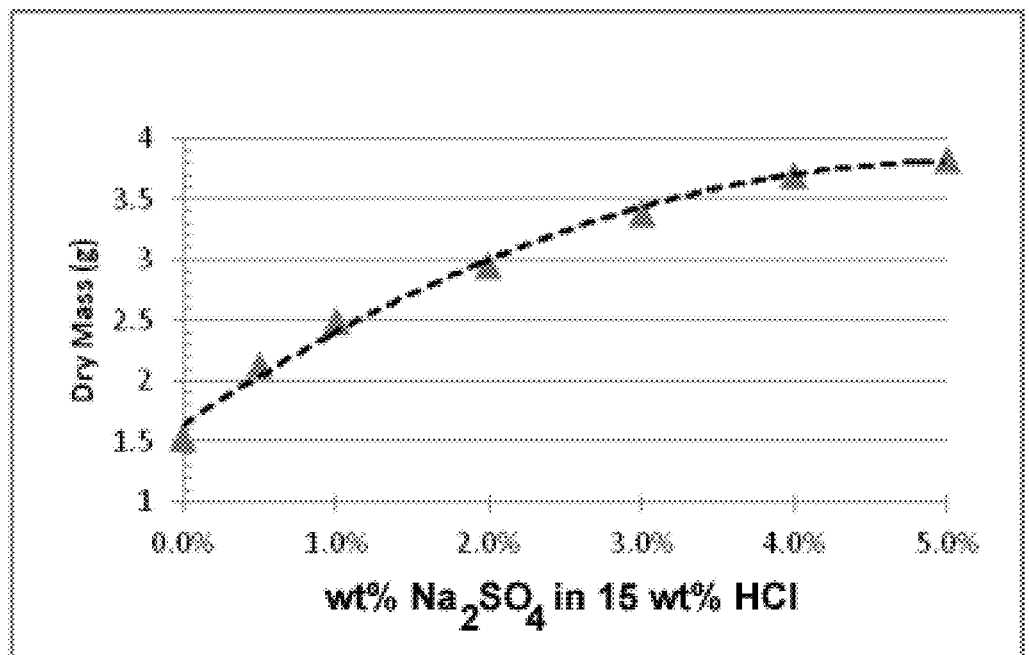
FIG. 12 is a plot showing the effect of $Na_2SO_4$ concentration on the mass of oven dried calcite specimens treated with 15 wt % HCl.
Figure 13:
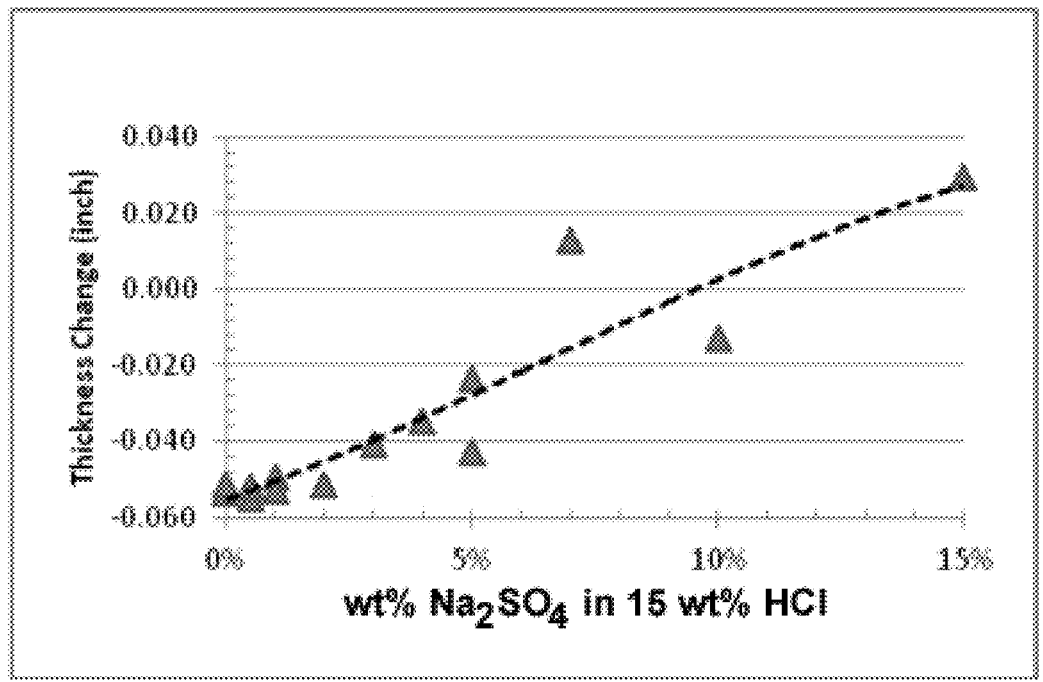
FIG. 13 is a plot showing the effect of $Na_2SO_4$ concentration on the thickness of oven dried calcite specimens treated with 15 wt % HCl.

After the reaction, the cores were air-dried for 2 h at ambient temperature before weighing. The cores were weighed once more after drying overnight at 225° F. (107° C.). Although the results were not adjusted for intitial masses, it is notable that the vast majority of cores had initial masses between a narrow window of 6.9 and 7.1 grams. The total reaction time was 10 min for each core. The resulting mass changes are summarized in FIGS. 11 and 12, and the thickness changes are shown in FIG. 13.

Example 10

Further tests were conducted to determine the mass loss on the cores over time. Medium-permeability (35-50 mD) Indiana limestone cores, presoaked in 2 wt % KCl, were submerged in 30 g of 15 wt % HCl solution for 15 min. The reaction vessel was closed with perforated paraffin film to allow the $CO_2$ to escape; the evolution of $CO_2$ was used to determine the extent of reaction. Masses were recorded every 10 s for 5 min, and every 20 s for the following 10 min. One- and two-minute intervals were separated and fit with a linear regression. The slopes are reported as the minute-averaged rates as shown below.

Figure 14:
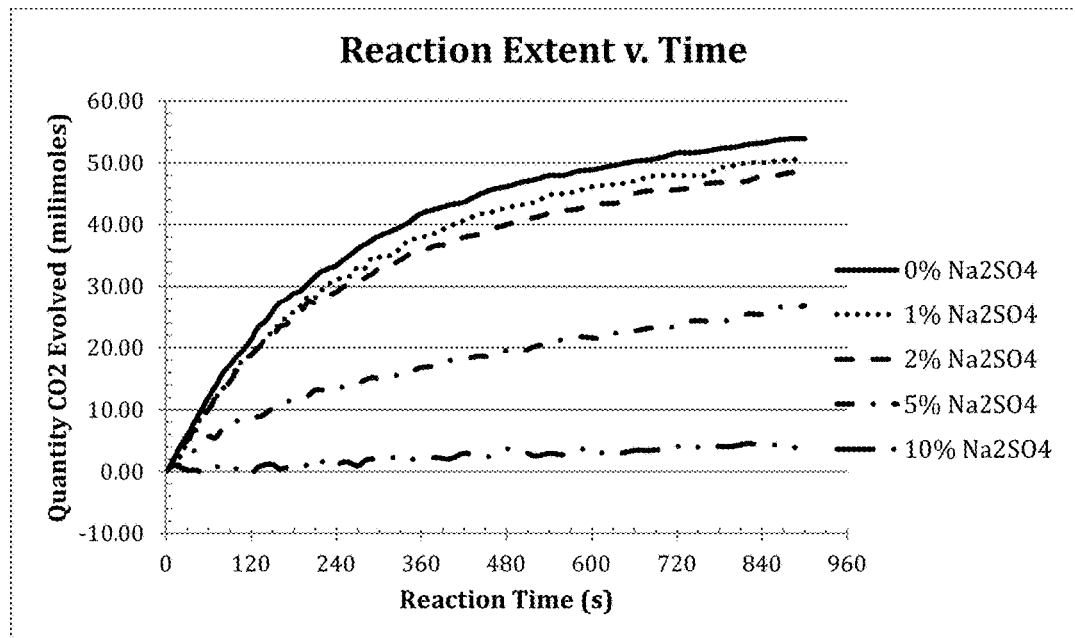
FIG. 14 is a plot showing the effect of $Na_2SO_4$ concentration on the extent of calcite specimen reaction versus time.

FIG. 14 depicts the effect of $CaSO_4$ concentration on the overall reaction rate at different time periods as measured by $CO_2$ evolution, which is in general following trend of inverse proportionality.

Figure 15:
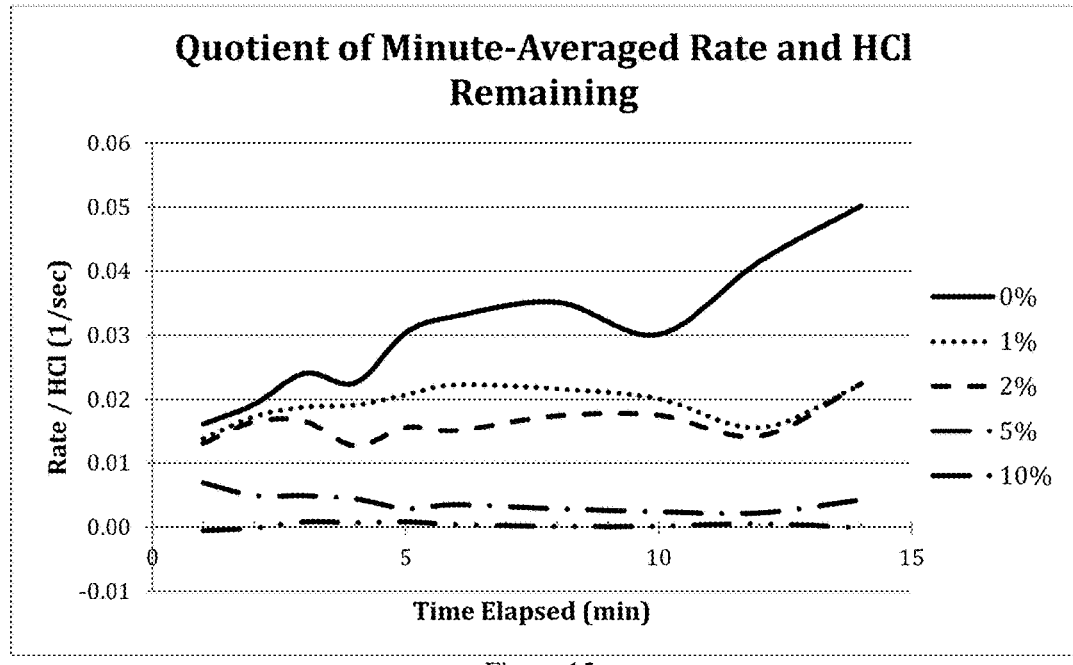
FIG. 15 is a plot that compares the reaction rates over time for various levels of $Na_2SO_4$ addition, normalized by the square of the quantity of HCl remaining.

FIG. 15 is a plot of the reaction rate over time as normalized against the square of remaining HCl. To normalize for the depletion of acid, these minute-averaged rates were divided by the square of the quantity of HCl remaining in solution. This metric was developed to account for the fact that the HCl in the reaction vessel was almost fully depleted in the absence of $Na_2SO_4$, thus providing a more realistic correlation with $Na_2SO_4$ concentration over a broader time window.

Examination of the reaction extent versus time revealed a dramatic trend. $Na_2SO_4$ addition as low as 1% by weight reduced the reaction rate sufficiently to produce a distinct reaction profile. The passivation effect correlated positively to $Na_2SO_4$ concentration, as expected. At 10 wt % $Na_2SO_4$, the core became coated with $CaSO_4$ extremely rapidly, and barely reacted over the 15 min period. This configuration used stagnant acidizing fluid and did not account for the shear flow of a real fracturing treatment.

Example 11

A two-stage treatment option was explored by varying the acid concentration when forming a $CaSO_4$ mask. Cores were weighed dry, then saturated with a 2 wt % KCl clay stabilizer. The first-stage treatment occurred in 25 g of acid solution (5 wt %, 7.5 wt %, 10 wt %, 12.5 wt %, and 15 wt % HCl, respectively in the absence of 5% $Na_2SO_4$). In each case, the second-stage treatment was 25 g of pure 15 wt % HCl irrespective of the first treatment. Exposure times of 2 min and 5 min were also tested. Reacted cores were rinsed and dried at 225° F. (107° C.) before weighing again.

Figure 16:
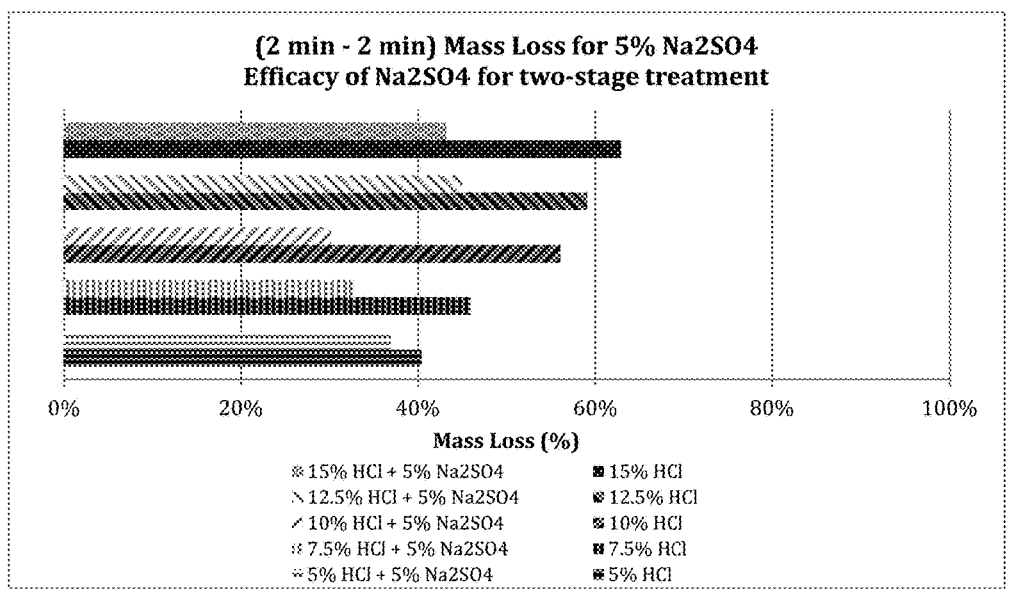
FIG. 16 is a plot showing the mass loss from calcite specimens treated with HCl alone and HCl+5% $Na_2SO_4$.

The 2-min and 5-min tests for 5 wt % $Na_2SO_4$ were also combined into a single time-averaged table. While a direct comparison of mass loss is possible, each sulfate-containing data point has its own sulfate-free reference. The proportion of mass lost in the former to the mass lost in the latter is the factor of mass loss; this factor is reported for the various treatment methods tested. The results are summarized in FIG. 16.

Because of the reactor configurations, round cores were sitting flat on the bottom of a reaction vessel. The extent to which the bottom and sides of the core reacted with the acid depended largely on the location of the cores. The center of the bottom was largely untouched, while the sides had some noticeable etching; this is due to lifting of $CaSO_4$ film by $CO_2$ bubbles, which caused the bottom face of the core to be exposed to the acid bath.

This test was aimed to determine the concentration of acid that provides the largest distinction between sulfate-rich and sulfate-free treatments. Each concentration of acid was tested for both of these conditions, and these data points should only be compared to each other. The trend of mass loss appears to indicate a local minimum at 10 wt % HCl. This suggests that for this configuration 10% HCl provided the best acidity for 5 wt % $Na_2SO_4$ to protect the surface. This result may not imply that 10 wt % HCl is the optimal concentration for any configuration.

Figure 17:
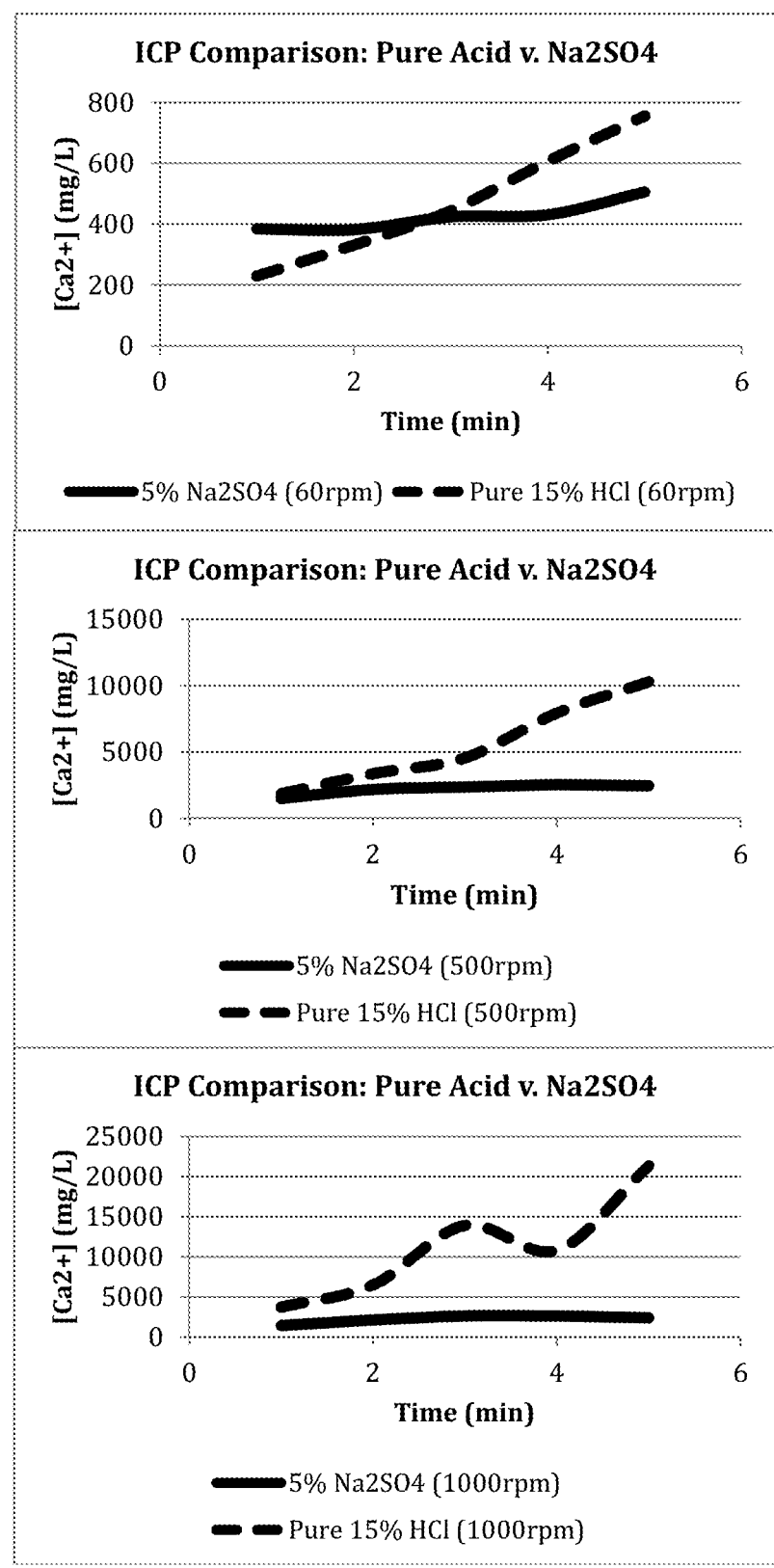
FIG. 17 is a series of plots that compare the generation of $Ca^{2+}$ ion in the presence of pure 15 wt % HCl versus 15 wt % HCl+5 wt % $Na_2SO_4$.

ICP results were compared to a pure 15 wt % HCl treatment at 150° F. (65.6° C.). Of particular importance is the slope of [$Ca^{2+}$] versus time. Since the mask film required freshly generated calcium ions to form, this system may be characterized as having a high reaction rate followed by a low one. The reaction rate tapered off rapidly after the transient period of mask formation (FIG. 17).

While there was some variability in the rotating disk experiments, it produced the most realistic conditions for an acid fracturing treatment. Elevated temperatures posed an additional challenge, as the reaction between HCl and $CaCO_3$ was accelerated. As a reference, 15 wt % HCl at 150° F. (65.6° C.) and 1000 rpm would completely dissolve a core in five minutes.

Although the original focus of $Na_2SO_4$ addition had been large-scale heterogeneity in the form of reducing the reaction rate, the potential for small-scale heterogeneity could be seen. The 5 wt % $Na_2SO_4$/15 wt % HCl reaction at 150° F. (65.6° C.) at both 500 rpm and 1000 rpm introduced rough surface features. These features (large pits and deep vugs) would contribute to fracture conductivity upon closure.

These tests employed the same acid solution at the same temperature and rotation velocity. Because fine $CaSO_4$ particles have the potential to plug formations and decrease the permeability of the formation, a simple test was performed to compare the quantity of $CaSO_4$ formed on the surface with the quantity formed in the bulk phase. The circular cores were saturated with 2 wt % KCl and reacted in 25 g of acid solution of a selected concentration for 2 min. The $Na_2SO_4$ concentration was held constant at 5 wt %, and the HCl concentrations of 5 wt %, 7.5 wt %, 10 wt %, 12.5 wt %, and 15 wt % were each tested. Following the reaction, spent-acid solutions were centrifuged, filtrate was separated, and $CaSO_4$ was air-dried overnight. Cores were air-dried immediately after reaction, weighed, thoroughly scrubbed to remove sulfate, dried, and weighed again.

While there was a visible amount of $CaSO_4$ in the bulk for the 5 wt % and 7.5 wt % HCl cases, the mass of which was less than 0.01 g, that was unregistered by the balance. As expected, a more acidic environment lead to less efficient mask deposition. This was likely due to the increased agitation by $CO_2$ bubbles evolved by the etching reaction. Recall that for this configuration, 10 wt % HCl provided the best protection, measured by total mass loss. From these data, 10 wt % HCl seems to waste very little $CaSO_4$ in the bulk.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims. Those skilled in the art will also appreciate that, although the present disclosure is presented in the context of treating subterranean wells, the technologies presented herein may also be useful in applications beyond the sphere of well servicing operations.

The invention claimed is:

1. A method for stimulating a subterranean well having a borehole and a carbonate formation having a surface and a fracturing pressure, comprising:
   (i) preparing a treatment fluid comprising an aqueous acidic solution of sodium sulfate, hydrochloric acid and methanesulfonic acid or its alkane, benzene or naphthalene derivative thereof or mixtures thereof,
   wherein the sodium sulfate is present in a concentration between 0.05% and 30.0% by weight of the treatment fluid,
   wherein the hydrochloric acid is present in a concentration between 7.5% and 28% by weight of the treatment fluid,
   wherein the methanesulfonic acid or its alkane, benzene or naphthalene derivative thereof or mixtures thereof is present in a concentration between 0.1% and 1.0% by weight of the treatment fluid;
   (ii) placing the treatment fluid in the well such that the aqueous acidic solution contacts the carbonate formation at a pressure lower than the fracturing pressure;
   (iii) allowing the sodium sulfate in the treatment fluid to contact and react with the carbonate formation for a period up to one hour, thereby forming an insoluble calcium sulfate protective film that covers the carbonate formation surface or part of the carbonate formation surface;
   (iv) placing a second acid solution in the well such that the acid contacts the carbonate formation at a pressure lower than the fracturing pressure;
   wherein the second acid solution comprises hydrochloric acid and the hydrochloric acid is present in a concentration of about 15% by weight of the second acid solution and
   v repeating steps (ii) to (iv) until a desired amount of stimulation is achieved.

* * * * *